(12) United States Patent
Quan et al.

(10) Patent No.: US 10,047,768 B2
(45) Date of Patent: Aug. 14, 2018

(54) DOUBLE-LOOP CONTROL SYSTEM WITH SINGLE HYDRAULIC MOTOR

(71) Applicant: TAIYUAN UNIVERSITY OF TECHNOLOGY, Taiyuan, Shanxi (CN)

(72) Inventors: Long Quan, Shanxi (CN); Youshan Gao, Shanxi (CN); Huimin Hao, Shanxi (CN); Jiahai Huang, Shanxi (CN); Jing Yang, Shanxi (CN)

(73) Assignee: TAIYUAN UNIVERSITY OF TECHNOLOGY, Taiyuan, Shanxi (CN)

( * ) Notice: Subject to any disclaimer, the term of this patent is extended or adjusted under 35 U.S.C. 154(b) by 148 days.

(21) Appl. No.: 15/101,399

(22) PCT Filed: Sep. 24, 2014

(86) PCT No.: PCT/CN2014/087288
§ 371 (c)(1),
(2) Date: Jun. 2, 2016

(87) PCT Pub. No.: WO2015/117338
PCT Pub. Date: Aug. 13, 2015

(65) Prior Publication Data
US 2016/0305455 A1    Oct. 20, 2016

(30) Foreign Application Priority Data
Feb. 10, 2014    (CN) .......................... 2014 1 0045978

(51) Int. Cl.
*F15B 21/14*    (2006.01)
*F15B 1/02*    (2006.01)
(Continued)

(52) U.S. Cl.
CPC .............. *F15B 1/024* (2013.01); *B60K 6/12* (2013.01); *E02F 9/128* (2013.01); *E02F 9/2217* (2013.01);
(Continued)

(58) Field of Classification Search
CPC .... F15B 2211/214; F15B 21/14; F15B 1/024; F15B 13/044; F15B 11/04; F15B 11/08;
(Continued)

(56) References Cited

U.S. PATENT DOCUMENTS 6,223,529 B1 *   5/2001   Achten ................. F04B 1/2042
                                                        60/416
6,854,268 B2 *   2/2005   Fales ....................... F15B 1/024
                                                        60/414
(Continued)

*Primary Examiner* — F. Daniel Lopez
*Assistant Examiner* — Abiy Teka

(57) ABSTRACT

A double-loop control system with a single hydraulic motor relates to a technical field of hydraulic transmission control, including a hydraulic motor (1), a positive control loop (2), a negative control loop (3), a hydraulic pump (4), an accumulator (5), and an oil tank, wherein the hydraulic motor (1) adopts a unique thrust structure with four inlet/outlet ports; the positive control loop (2) and the negative control loop (3) independently control the hydraulic motor (1), wherein the positive control loop (2) and the negative control loop (3) drive together or only one drives; or braking kinetic energy and potential energy of loads are stored in the accumulator (5) for energy recovery. The present invention uses only one hydraulic motor for satisfying different work conditions and different load driving requirements with advantages such as simple structure, high system reliability and high energy efficiency.

5 Claims, 3 Drawing Sheets

(51) Int. Cl.
    *E02F 9/12*     (2006.01)
    *E02F 9/22*     (2006.01)
    *F16H 61/00*     (2006.01)
    *B60K 6/12*     (2006.01)
    *F15B 11/04*     (2006.01)
    *F15B 11/08*     (2006.01)
    *F15B 13/04*     (2006.01)
    *F15B 13/044*     (2006.01)
    *F16H 61/02*     (2006.01)

(52) U.S. Cl.
    CPC .......... *E02F 9/2289* (2013.01); *E02F 9/2296* (2013.01); *F15B 11/04* (2013.01); *F15B 11/08* (2013.01); *F15B 13/0401* (2013.01); *F15B 13/044* (2013.01); *F15B 21/14* (2013.01); *F16H 61/00* (2013.01); *F16H 61/0025* (2013.01); *F16H 61/0267* (2013.01); *F15B 2013/041* (2013.01); *F15B 2211/20515* (2013.01); *F15B 2211/20523* (2013.01); *F15B 2211/20538* (2013.01); *F15B 2211/20546* (2013.01); *F15B 2211/20561* (2013.01); *F15B 2211/212* (2013.01); *F15B 2211/214* (2013.01); *F15B 2211/265* (2013.01); *F15B 2211/3058* (2013.01); *F15B 2211/30575* (2013.01); *F15B 2211/625* (2013.01); *F15B 2211/6309* (2013.01); *F15B 2211/6313* (2013.01); *F15B 2211/7051* (2013.01); *F15B 2211/7058* (2013.01); *F15B 2211/761* (2013.01); *F15B 2211/88* (2013.01); *F16H 2061/0034* (2013.01)

(58) Field of Classification Search
    CPC ............. F15B 13/0401; F16H 61/0267; F16H 61/0025; B60K 6/12; E02F 9/2217
    See application file for complete search history.

(56) References Cited

U.S. PATENT DOCUMENTS 9,140,273 B2 *   9/2015   Stroganov ........... F15B 11/0725
2013/0061587 A1 *   3/2013   Jagoda ................... E02F 9/123
                                                              60/414

* cited by examiner

DOUBLE-LOOP CONTROL SYSTEM WITH SINGLE HYDRAULIC MOTOR

CROSS REFERENCE OF RELATED APPLICATION

This is a U.S. National Stage under 35 U.S.C 371 of the International Application PCT/CN2014/087288, filed Sep. 24, 2014, which claims priority under 35 U.S.C. 119(a-d) to CN 201410045978.X, filed Feb. 10, 2014.

BACKGROUND OF THE PRESENT INVENTION

Field of Invention

The present invention relates to technical field of hydraulic transmission control, and more particularly to a double-loop control system with a single hydraulic motor.

Description of Related Arts

As a rotating actuator, a hydraulic motor mainly drives machines for rotating, lifting and traveling. In real application, due to a relatively large inertia of a driven load, a large output torque is often required during starting and accelerating; during stably operating, much less torque is required; and during braking, a large barking torque is needed. Therefore, system pressure and displacement must be determined to select a hydraulic motor according to a maximum torque during working, which often increases a volume of the hydraulic motor and a volume of a corresponding hydraulic control system, which results in lower working efficiency of an entire system.

During rotating, lifting and traveling processes of the conventional hydraulic valve control mechanism, kinetic energy generated by rotating-braking or decelerating braking, potential energy generated during falling or traveling downhill are wasted by being transformed into heat of oil through a throttling effect of valves, and the heat is also a main reason causing hydraulic systems failure. In order to reduce the heating, an additional cooling system is needed to cool the oil, which further increases the systems energy consumption. If the wasted energy can be recycled, that not only can save energy and reduce the system installed power, but also can reduce the system failure probability and improve the production efficiency. Chinese patent application, CN 201180033048.7, discloses a hybrid power excavator which stores and utilizes the kinetic energy of rotating-braking, based on a conventional rotating control loop, a motor/generator driven together with a rotating mechanism is added. When an excavator upper portion is in rotating-braking, the motor/generator is under generator state to store the kinetic energy during the rotating-braking in super-capacitors; when an excavator upper portion is in accelerating-rotating again, the motor/generator is under motor state to drive the upper portion rotating together with an original hydraulic system, the motor/generator will stop after accelerating. The hybrid power excavator not only improves the energy efficiency of the system, but also reduces the size and power of the hydraulic system. However, the shortcomings of it are that this method is only applicable to hybrid power machines, and cost is high.

Chinese patent application, CN201010106824.9, discloses a rotating-decelerating energy recovery system for a hydraulic excavator, based on a conventional hydraulic motor system controlled by multi-way valve, two hydraulic control commutate valves are respectively set up on both sides of a hydraulic motor, and an accumulator and two pressure sensors are added. When the pressure sensors detect that the hydraulic motor is braking, the system automatically controls the hydraulic control commutate valves to change a direction, wherein an oil chamber with high pressure connects with the accumulator; when the system is in accelerating-rotating again, high-pressure oil stored in the accumulator enters a multi-way valve inlet through a solenoid valve and a check valve to realize recycling. However, the accumulator state will affect the operating speed characteristics during rotating, and the stored energy cannot be fully used.

International patent application, WO2013/003049A2, published on Jan. 3, 2013, discloses a rotating-braking energy recovery system for a hydraulic excavator, in this system a selector valve, an accumulator filling valve, an accumulator draining valve and an accumulator are set up in an separate meter-in and separate meter-out hydraulic motor control loop. The selector valve is a hydraulic control two-position three-way valve, two control chambers respectively connect with two chambers of a hydraulic motor, so that an oil port of the valve is always connected to the chamber of the hydraulic motor with a higher pressure. When the hydraulic motor is braking, high-pressure oil will charge into the accumulator through the selector valve and the accumulator filling valve to recycle braking energy; when the motor is accelerating, the accumulator provides oil into inlet chamber of the hydraulic motor through the accumulator draining valve and the selector valve to regenerate and utilize the stored braking energy. However, a storage loop and a control loop of the system can't drive the hydraulic motor at the same time, and when the storage loop individually drives the hydraulic motor, the power is insufficient, which will affect the recycling effect.

Although the above technologies are able to effectively recover energy during rotating, lifting and travelling; and the energy is used as driving force. But all of the above technologies are not able to use only one hydraulic motor to satisfy different work conditions and different load driving requirements with advantages such as simple structure, high system reliability, and high energy efficiency at the same time.

SUMMARY OF THE PRESENT INVENTION

A purpose of the present invention is to overcome problems of hydraulic motors and corresponding hydraulic systems in realizing integration of working mechanisms hydraulically driven and energy recovery, and provide double-loop control system with a single hydraulic motor. By combining one hydraulic motor and two control loops, the integration of hydraulically driving and energy recovery is realized.

Accordingly, a single-hydraulic motor double-loop control system is provided, comprising: a hydraulic motor, a positive control loop, a negative control loop, a hydraulic pump, an accumulator, and an oil tank (T), wherein a first oil port (A), a second oil port (B), a third oil port (C), and a fourth oil port (D) are provided on the hydraulic motor;

the positive control loop consists of a first working oil port (E) and a second working oil port (F), where oil is respectively suctioned through a positive control loop inlet port (E') and returned through a positive control loop outlet port (F'); the first working oil port (E) of the positive control loop connects with the first port (A) of the hydraulic motor, the second working oil port (F) of the positive control loop connects with the second port (B) of the hydraulic motor, the positive control loop inlet port (E') connects with an outlet port of the hydraulic pump, and the positive control loop outlet port (F') connects with the oil tank (T) or an inlet port of the hydraulic pump. The positive control loop is an open loop with separate controlling of meter-in and meter-out of inlet and outlet port, or a closed loop controlled by the hydraulic pump;

wherein the negative control loop comprises a third working oil port (G) and a fourth working oil port (H), where the oil is respectively suctioned through a negative control loop inlet port (G') and returned through a negative control loop outlet port (H'); the third working oil port (G) of the negative control loop connects with the third port (C) of the hydraulic motor, the fourth working oil port (H) of the negative control loop connects with the fourth port (D) of the hydraulic motor, the negative control loop inlet port (G') connects with the accumulator, and the negative control loop outlet port (H') connects with the oil tank (T) or the accumulator; wherein the negative control loop is an open loop with separate meter-in and separate meter-out control system, or an open loop controlled by a proportional direction valve;

wherein the positive control loop and the negative control loop work independently and can be used interchangeably; when a system needs a higher driving force, the positive control loop and the negative control loop will drive the hydraulic motor together; when the system needs a lower driving force, one of the active control loop or the negative control loop will individually drive the hydraulic motor, and the other one will stop working; when the hydraulic motor is decelerating-braking or is dragged to move by a load, the positive control loop will stop work, and the negative control loop will store the braking kinetic energy and potential energy of the load into the accumulator for energy recovery.

The hydraulic motor is an axial piston hydraulic motor or a blade hydraulic motor; the hydraulic pump is a constant hydraulic pump or a two-way displacement-variable pump.

When the positive control loop is the open loop with separate meter-in and separate meter-out control system, the positive control loop comprises three pressure sensors, four two-position two-way proportional throttle valves, and a relief valve; when the negative control loop is the open loop controlled by the proportional direction valve, the negative control loop comprises a check valve and an electromagnetic proportional direction valve.

When the positive control loop is the close loop controlled by the hydraulic pump, the positive control loop comprises a first relief valve, a second relief valve, a third relief valve, a first check valve, a second check valve, a fifth two-position two-way proportional throttle valve, and a slippage pump; when the negative control loop is the open loop with separate meter-in and separate meter-out control system, the negative control loop comprises a first pressure sensor, a second pressure sensor, a third pressure sensor, a first two-position two-way proportional throttle valve, a second two-position two-way proportional throttle valve, a third two-position two-way proportional throttle valve, a fourth two-position two-way proportional throttle valve, and a first relief valve.

According to the present invention, double loops with the single hydraulic motor are adopted. By redesigning thrust windows of a conventional hydraulic piston motor or a conventional blade motor, the control loops of two motors are integrated in one motor with functions of energy recovery and regeneration, wherein the positive control loop and an energy storage loop can drive the hydraulic motor together to take full advantage of stored energy. During energy storing phase, the two loops also can work together to conveniently control the braking speed. Compared with prior art, the present invention has advantages as follows:

(1) Through the double-loop control system with the single hydraulic motor, the engineering machinery operation mechanisms can be classification driven and kinetic as well as potential energy can be recovered, operation speeds, directions and displacements of the operation mechanisms can be controlled continuously, and the integration of the operation mechanisms of the engineering machines and the energy recovery of the kinetic and potential energy;

(2) when the working mechanism is starting or accelerating, the positive control loop and the negative control loop drive together to output relatively large power; when the operation mechanism has started or is slowly accelerating, a relative small driving power is needed, which can be driven by positive control loop or the negative control loop individually;

(3) the system is simple and convenient, and the energy efficiency is high.

Figure 1:
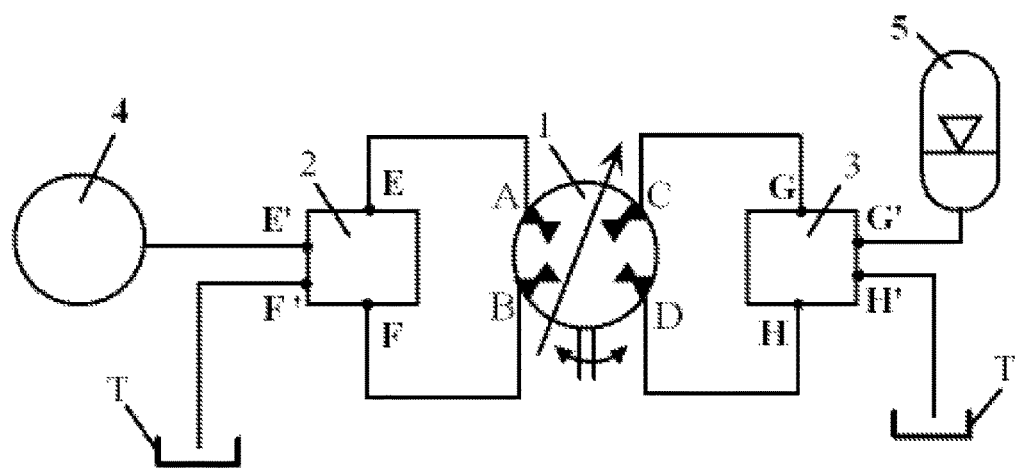
FIG. 1 is a schematic view of a double-loop control system with a single hydraulic motor.

Where, 1—hydraulic motor, 2—positive control loop, 3—negative control loop, 4—hydraulic pump, 5—accumulator, 6—thrust plate, 7—first thrust slot, 8—second thrust slot, 9—third thrust slot, 10—fourth thrust slot, 19—motor case, 20—first thrust window, 21—second thrust window, 22—third thrust window, 23—fourth thrust window, 24—stator, 25—rotor, 26—blade, 27—pressure sensor, 28—second pressure sensor, 29—first two-position two-way proportional throttle valve, 30—second two-position two-way proportional throttle valve, 31—first overflow valve, 32—third two-position two-way proportional throttle valve, 33—fourth two-position two-way proportional throttle valve, 34—third pressure sensor, 35—electromagnetic proportional direction valve, 36—first check valve, 37—second check valve, 38—low pressure accumulator, 39—power source, 40—swash plate angle controller, 41—second relief valve, 42—third overflow valve, 43—slippage pump, 44—fifth two-position two-way proportional throttle valve, A—first oil port, B—second oil port, C—third oil port, D—fourth oil port, E—first working oil port, F—second working oil port, G—third working oil port, H—fourth working oil port, E'—positive control loop inlet port, F'—positive control loop outlet port, G'—negative control loop inlet port, H'—negative control loop outlet port, M—first working oil port of electromagnetic proportional direction valve, N—second working oil port of electromagnetic proportional direction valve, O—electromagnetic proportional direction valve outlet port, P—electromagnetic proportional direction valve inlet port, T—oil tank.

DETAILED DESCRIPTION OF THE PREFERRED EMBODIMENT

Referring to the drawings, the technical scheme of the present invention will be further illustrated in detail.

Referring to FIG. 1, a double-loop control system with a single hydraulic motor comprises a hydraulic motor 1, a positive control loop 2, a negative control loop 3, a hydraulic pump 4, an accumulator 5, and an oil tank T, wherein a first oil port A, a second oil port B, a third oil port C, and a fourth oil port D are set up on the hydraulic motor 1; wherein the positive control loop 2 comprises a first working oil port E and a second working oil port F, which respectively suctions oil through a positive control loop inlet port E' and returns the oil through a positive control loop outlet port F'; the two working oil ports of the positive control loop connect the two inlet and outlet ports of hydraulic motor respectively, and the positive control loop inlet port E' connects with the outlet port of the hydraulic pump 4; wherein the positive control loop 2 is an open loop with separate meter-in and separate meter-out control system or a closed loop controlled by the hydraulic pump. The negative control loop comprises a third working oil port G and a fourth working oil port H, which oil is respectively suctioned through a negative control loop inlet port G' and returned through a negative control loop outlet port H'; the two working oil ports of the negative control loop connect the another two inlet and outlet ports of hydraulic motor respectively, the negative control loop inlet port G' connects with the accumulator, the negative control loop outlet port H' connects with the oil tank T or the accumulator; wherein the negative control loop 3 is an open loop with separate meter-in and separate meter-outer control system, or an open loop controlled by a proportional direction valve.

The positive control loop 2 and the negative control loop 3 work independently and can be used interchangeably, namely the positive control loop 2 can work as the negative control loop 3 and the negative control loop 3 can work as the positive control loop 2; when the system needs higher driving force, the positive control loop 2 and the negative control loop 3 drive the hydraulic motor 1 together simultaneously; when the system needs lower driving force, one of the positive control loop 2 or the negative control loop 3 drives the hydraulic motor 1 individually, the other loop stops working; when the hydraulic motor 1 is in decelerating-braking or is dragged to move by a load, the positive control loop 2 stops working, and the negative control loop 3 stores the braking kinetic energy and potential energy of the load into the accumulator 5 to realize energy recovery.

The hydraulic motor 1 is an axial piston hydraulic motor or a blade hydraulic motor; the hydraulic pump 4 is a constant hydraulic pump or a two-way displacement-variable pump.

Figure 2:
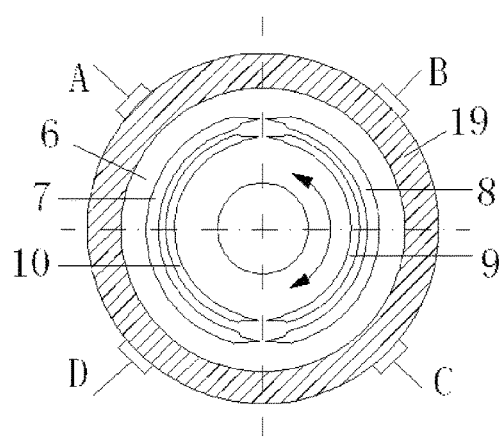
FIG. 2 is a sketch view of a thrust plate of a double-acting axial piston hydraulic motor.

Referring to FIG. 2, when the hydraulic motor is an axial piston hydraulic motor, the structure of its thrust plate 6 is shown as follows: there is an inner circumference and an outer circumference on the body of the thrust plate 6, four waist shaped thrust slots are provided zygomorphic; wherein a first thrust slot 7 and a second thrust slot 8 are to zygomorphic provided on the outer circumference, and a third thrust slot 9 and a fourth thrust slot 10 are zygomorphic provided on the inner circumference. Relief grooves are provided at the front end and the rear end of each of the four waist shaped thrust slots. The first thrust slot 7, the fourth thrust slot 10, the second thrust slot 8 and the third thrust slot 9 respectively occupy a half circle. The first thrust slot 7, the second thrust slot 8, the third thrust slot 9 and the fourth thrust slot 10 respectively connect with the first oil port A, the second oil port B, the third oil port C and the fourth oil port D of the hydraulic motor through pipelines.

Figure 3:
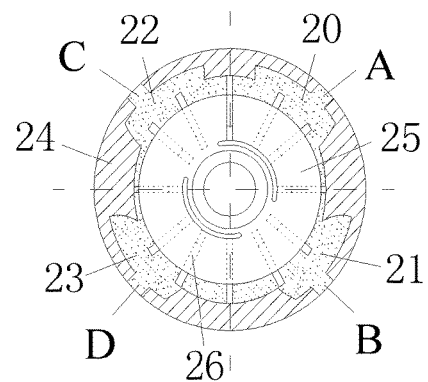
FIG. 3 is a sketch view of a thrust plate of a double-acting blade hydraulic motor.

Referring to FIG. 3, when the hydraulic motor 1 is the blade hydraulic motor, a structure of a thrust plate 6 is shown as follows: four independent and symmetrical thrust windows are provided on an inner circumference of the stator 24. a first thrust window 20, a second thrust window 21, a third thrust window 22 and a fourth thrust window 23 respectively connect with the first oil port A, the second oil port B, the third oil port C and the fourth oil port D of the hydraulic motor.

Preferred Embodiment 1

Figure 4:
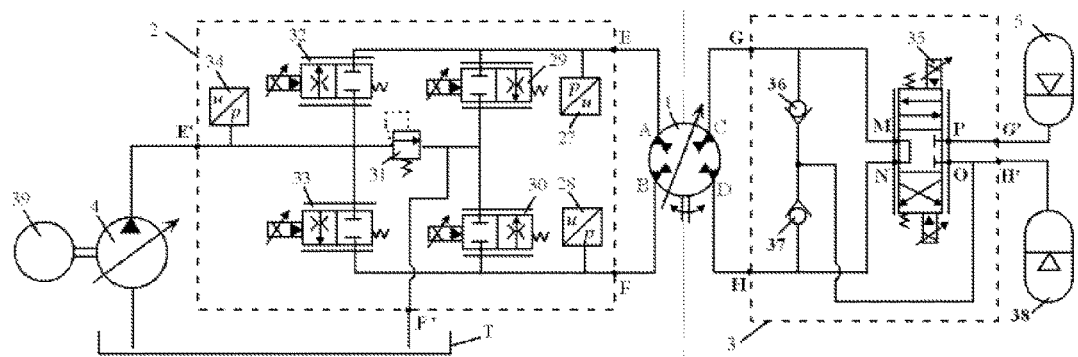
FIG. 4 is a schematic view of the double-loop control system with the single hydraulic motor according to a preferred embodiment 1.

Referring to FIG. 4, according to the preferred embodiment 1, the positive control loop 2 of the double-loop control system with one hydraulic motor is the open loop with the separate meter-in and separate meter-out control system; the negative control loop 3 is the open loop controlled by the proportional direction valve; wherein the positive control loop 2 comprises a first pressure sensor 27, a second pressure sensor 28, a third pressure sensor 34, a first two-position two-way proportional throttle valve 29, a second two-position two-way proportional throttle valve 30, a third two-position two-way proportional throttle valve 32, a fourth two-position two-way proportional throttle valve 33, and a first relief valve 31; wherein the negative control loop 3 comprises a first check valve 36, a second check valve 37 and an electromagnetic proportional direction valve 35;

wherein the first working oil port E of the positive control loop 2 connects with the first oil door A of the hydraulic motor 1, the second working oil port F of the positive control loop 2 connects with the second oil port B of the hydraulic motor 1; the third working oil port G of the negative control loop 3 connects with the third oil port C of the hydraulic motor 1, the fourth working oil port H of the negative control loop 3 connects with the fourth oil door D of the hydraulic motor 1; the outlet port of the hydraulic pump 4 connects with the positive control loop inlet port E', the inlet port of the hydraulic pump 4 connects with the oil tank T; the positive control loop outlet port F' connects with the oil tank T; the negative control loop inlet port G' connects with the accumulator 5, and the negative control loop outlet port H' connects with a low pressure accumulator 38; in the positive control loop 2, an inlet port of the first two-position two-way proportional throttle valve 29 connects with the first working oil port E of the positive control loop 2, an outlet port of the first two-position two-way proportional throttle valve 29 connects with the positive control loop outlet port F'; an inlet port of the second two-position two-way proportional throttle valve 30 connects with the second working oil port F of the positive control loop 2, an outlet port of the second two-position two-way proportional throttle valve 30 connects with the positive control loop outlet port F'; an inlet port of the third two-position two-way proportional throttle valve 32 connects with the positive control loop inlet port E', an outlet port of the third two-position two-way proportional throttle valve 32 connects with the first working oil port E of the positive control loop 2; an inlet port of the fourth two-position two-way proportional throttle valve 33 connects with the positive control loop inlet port E', an outlet port of the fourth two-position two-way proportional throttle valve 33 connects with the second working oil port F of the positive control loop 2; the first pressure sensor 27 is installed on the pipeline which connects the inlet port of the first two-position two-way proportional throttle valve 29 and the first working oil port E of the positive control loop 2; the second pressure sensor 28 is installed on the pipeline which connects the inlet port of the second two-position two-way proportional throttle valve 30 and the second working oil port F of the positive control loop 2; the first relief valve 31 and the third pressure sensor 34 are installed on the pipeline which connects the positive control loop inlet port E' and the positive control loop outlet port F' in sequence; in the negative control loop 3, the electromagnetic proportional direction valve inlet port P, the electromagnetic proportional direction valve outlet port O, the working oil port M and the working oil port N respectively connect with the negative control loop inlet port G', the negative control loop outlet port H', the third working oil port G of the negative control loop 3, and the fourth working oil port H of the negative control loop 3; the outlet port and the inlet port of the first check valve 36 respectively connect with the third working oil port G and the outlet port H' of the negative control loop 3; the outlet port and inlet port of the second check valve 37 respectively connect with the fourth working oil port H and the outlet port H' of the negative control loop 3.

According to the double-loop control system with the single hydraulic motor of the preferred embodiment 1, when a working equipment is starting or accelerating, the fourth two-position tow-way proportional throttle valve 33 and the first two-position two-way proportional throttle valve 29 of the positive control loop 2 are turned on to control the hydraulic pump 4 to feed oil into the hydraulic motor 1; meanwhile, the electromagnetic proportional direction valve 35 of the negative control loop 3 is at an upper portion as shown in the drawing to control the accumulator 5 to feed oil into the hydraulic motor 1. Alternatively, the third two-position tow-way proportional throttle valve 32 and the second two-position two-way proportional throttle valve 30 of the positive control loop 2 are turned on to control the hydraulic pump 4 to feed oil into the hydraulic motor 1; meanwhile, the electromagnetic proportional direction valve 35 of the negative control loop 3 is at the lower portion as shown in the drawing to control the accumulator 5 to feed oil into the hydraulic motor 1. Under the above two conditions, the positive control loop 2 and the negative control loop 3 drive the hydraulic motor 1 together so that can output a relatively large power.

When the working equipment has started or is slowly accelerating, a relatively small power is needed. At this time, the positive control loop 2 or the negative control loop 3 individually controls the hydraulic motor 1. If the positive control loop 2 drives the hydraulic motor 1, the fourth two-position tow-way proportional throttle valve 33 and the first two-position two-way proportional throttle valve 29 of the positive control loop 2 are turned on, or the third two-position tow-way proportional throttle valve 32 and the second two-position two-way proportional throttle valve 30 of the positive control loop 2 are turned on; meanwhile, the electromagnetic proportional direction valve 35 of the negative control loop 3 is at middle portion, and the negative control loop 3 stops working. If the negative control loop 3 drives the hydraulic motor 1, the electromagnetic proportional direction valve 35 of the negative control loop 3 is at the upper portion or the lower portion as shown in the drawing; meanwhile, the first two-position two-way proportional throttle valve 29 and the second two-position two-way proportional throttle valve 30 of the positive control loop 2 are turned on, and the positive control loop 2 stops working.

When the working equipment is in decelerating-braking or load is in falling process, the first two-position two-way proportional throttle valve 29 and the second two-position two-way proportional throttle valve 30 of the positive control loop 2 are turned on, and the positive control loop 2 stops working; the hydraulic motor 1 connecting with the negative control loop 3 is under pump state, and the electromagnetic proportional direction valve 35 of the negative control loop 3 is at the upper portion or the lower portion as shown in the drawing, so that the kinetic and potential energy can be transformed into hydraulic energy and stored in the accumulator 5 for further utilization.

Preferred Embodiment 2

Figure 5:
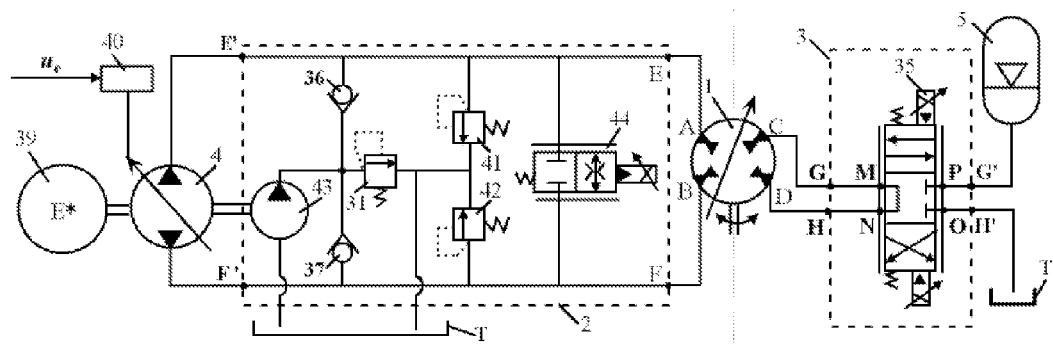
FIG. 5 is a schematic view of the double-loop control system with the single hydraulic motor according to a preferred embodiment 2.

Referring to FIG. 5, according to the preferred embodiment 2, the positive control loop 2 of the double-loop control system with the single hydraulic motor is a closed loop controlled by the hydraulic pump 4; the negative control loop 3 is an open loop controlled by the proportional direction valve; wherein the positive control loop 2 comprises a first relief valve 31, a second relief valve 41, a third relief valve 42, a first check valve 36, a second check valve 37, a fifth two-position two-way proportional throttle valve 44, and a slippage pump 43; wherein the negative control loop 3 comprises an electromagnetic proportional direction valve 35; a hydraulic pump 4 is a two-way displacement-variable pump driven by a power source 39, wherein the power source is an internal-combustion engine or a motor with a constant rotation rate;

wherein the first working oil port E of the positive control loop 2 connects with the first oil door A of the hydraulic motor 1, the second working oil port F of the positive control loop 2 connects with the second oil port B of the hydraulic motor 1; the third working oil port G of the negative control loop 3 connects with the third oil port C of the hydraulic motor 1, the fourth working oil port H of the negative control loop 3 connects with the fourth oil port D of the hydraulic motor 1; the outlet port of the hydraulic pump 4 connects with the positive control loop inlet port E', the inlet port of the hydraulic pump 4 connects with the positive control loop outlet port F'; the hydraulic pump 4 connects with the slippage pump 43 in serious, and the power source 39 connects with the hydraulic pump 4; the negative control loop inlet port G' connects with the accumulator 5, and the negative control loop outlet port H' connects with the oil tank T; in the positive control loop 2, an inlet port and the outlet port of the first check valve 36 respectively connect with an outlet port of the slippage pump 43 and the first working oil port E of the positive control loop 2; an inlet port and an outlet port of the second check valve 37 respectively connect with the outlet port of the slippage pump 43 and the second working oil port F of the positive control loop 2; an inlet port and an outlet port of the first relief valve 31 respectively connect with the outlet port of the slippage pump 43 and the oil tank T; an inlet port and an outlet port of the second relief valve 41 respectively connect with the first working oil port E of the positive control loop 2 and the oil tank T; an inlet port and an outlet port of the third relief valve 42 respectively connect with the second working oil port F of the positive control loop 2 and the oil tank T; in the negative control loop 3, the electromagnetic proportional direction valve inlet port P and the outlet port O, the first electromagnetic proportional direction valve working oil port M and the second electromagnetic proportional direction valve working oil port N of the electromagnetic proportional direction valve 35 respectively connect with the negative control loop inlet port G', the negative control loop outlet port H', the third working oil port G of the negative control loop 3, and the fourth working oil port H of the negative control loop 3.

According to the double-loop control system with the single hydraulic motor of the preferred embodiment 2, when a working equipment is starting or accelerating, the hydraulic pump 4 of the positive control loop 2 feeds oil into the hydraulic motor, and the fifth two-position two-way proportional throttle valve 44 is at stopping position; meanwhile, the electromagnetic proportional direction valve 35 of the negative control loop 3 is at upper portion or lower portion as shown in the drawing to control the accumulator 5 to feed oil into hydraulic motor 1. At this time, the positive control loop 2 and the negative control loop 3 drive the hydraulic motor 1 together so that can output a relatively large power.

When the working equipment has started or is slowly accelerating, the positive control loop 2 or the negative control loop 3 individually controls the hydraulic motor 1. If the positive control loop 2 drives the hydraulic motor 1, the hydraulic pump 4 of the positive control loop 2 feeds oil into hydraulic motor; meanwhile, the electromagnetic proportional direction valve 35 of the negative control loop 3 is at an middle portion as shown in the drawing, and the negative control loop 3 stops working. If the negative control loop 3 drives the hydraulic motor 1, the electromagnetic proportional direction valve 35 of the negative control loop 3 is at upper portion or lower portion as shown in the drawing, the fifth two-position two-way proportional throttle valve 44 is turned on, and the positive control loop stops working.

When the working equipment is in decelerating-braking or load is in falling process; the hydraulic motor 1 connecting with the negative control loop 3 is under pump state, and the electromagnetic proportional direction valve 35 of the negative control loop 3 is a upper portion or lower portion as shown in the drawing, so that the kinetic and potential energy can be transformed into hydraulic energy and stored in the accumulator 5 for further utilization.

Preferred Embodiment 3

Figure 6:
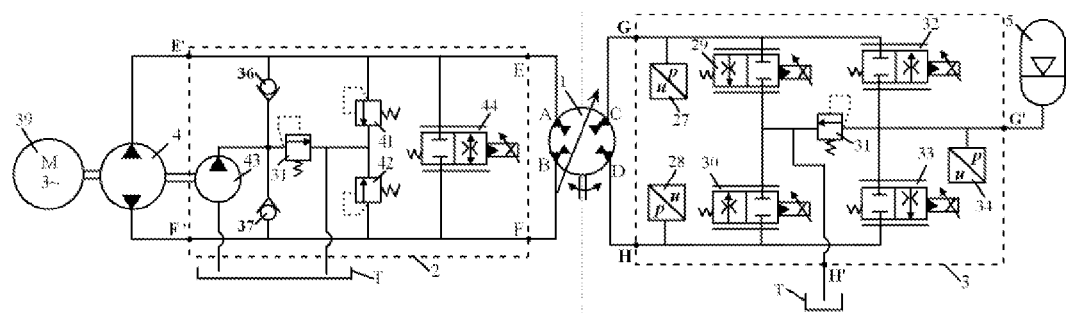
FIG. 6 is a schematic view of the double-loop control system with the single hydraulic motor according to a preferred embodiment 3.

Referring to FIG. 6, the hydraulic pump 4 is a constant hydraulic pump, the power source 39 is a speed variable motor, wherein the motor can be an AC induction motor, an AC or DC servo motor, or a switched reluctance motor, etc., with a rotation speed controller.

According to the double-loop control system with the single hydraulic motor of the preferred embodiment 3, the positive control loop 2 is a closed loop controlled by the hydraulic pump 4, which is the same as that of the preferred embodiment 2; the negative control loop 3 is an open loop with separate meter-in and separate meter-out control system, which is the same as that of the preferred embodiment 1.

Connections between the positive control loop 2 and the hydraulic motor 1 are the same as that of the preferred embodiment 2; the third working oil port G and the fourth working oil port H of the negative control loop 3 respectively connect with the third oil port C and the fourth oil port D of the hydraulic motor 1; the negative control loop inlet port G' and the negative control loop outlet port H' respectively connect with the accumulator 5 and the oil tank T.

According to the double-loop control system with the single hydraulic motor of the preferred embodiment 3, when a working equipment is starting or accelerating, the hydraulic pump 4 of the positive control loop 2 feeds oil into motor 1; meanwhile, the fourth two-position tow-way proportional throttle valve 33 and the first two-position two-way proportional throttle valve 29 of the positive control loop 2 are turned on. Alternatively, the third two-position tow-way proportional throttle valve 32 and the second two-position two-way proportional throttle valve 30 of the positive control loop 2 are turned on to control the accumulator 5 to feed oil into the hydraulic motor 1. At this time, the positive control loop 2 and the negative control loop 3 drive the hydraulic motor 1 together so that can output relatively large power.

When the working equipment has started or is slowly accelerating, the relatively small power is needed. At this time, the positive control loop 2 or the negative control loop 3 individually controls the hydraulic motor 1. If the positive control loop 2 drives the hydraulic motor 1, the hydraulic pump 4 of the positive control loop 2 feeds oil into hydraulic motor, and the negative control loop 3 stops working. If the negative control loop 3 drives the hydraulic motor 1, the fourth two-position two-way proportional throttle valve 33 and the first two-position two-way proportional throttle valve 29 of the positive control loop 2 are turned on, or the third two-position tow-way proportional throttle valve 32 and the second two-position two-way proportional throttle valve 30 of the positive control loop 2 are turned on; the accumulator 5 feeds oil into hydraulic motor 1; meanwhile, the fifth two-position two-way proportional throttle valve 44 is turned on, and the positive control loop stops working.

When the working equipment is in decelerating-braking or load is in falling process, the hydraulic motor 1 connecting with the negative control loop 3 is under pump state, the fourth two-position tow-way proportional throttle valve 33 and the first two-position two-way proportional throttle valve 29 of the positive control loop 2 are turned on, or the third two-position tow-way proportional throttle valve 32 and the second two-position two-way proportional throttle valve 30 of the positive control loop 2 are turned on, so that the kinetic and potential energy can be transformed into hydraulic energy and stored in the accumulator 5 for further utilization.

In the above preferred embodiments, the first two-position two-way proportional throttle valve 29, the second two-position two-way proportional throttle valve 30, the third two-position two-way proportional throttle valve 32, the fourth two-position two-way proportional throttle valve 33, and the fifth two-position two-way proportional throttle valve 44 can also be two-position two-way selector valves, which can be valves directly driven by solenoids, pilot valves controlled by the solenoids, or combinations of the above valves, valves with internal feedbacks, or valves with displacement sensors which are controlled by electronic close loops. The relief valve 31 is a direct relief valve. The electromagnetic proportional direction valve 35 is alternatively an electromagnetic selector valve. With a thrust structure as shown in FIGS. 2 and 3, the quantity of the inlet port and outlet of the hydraulic motor 1 can be extended from 2 to 4.

What is claimed is:
1. A double-loop control system with a single hydraulic motor, comprising: a hydraulic motor (1), a positive control loop (2), a negative control loop (3), a hydraulic pump (4), an accumulator (5), and an oil tank (T), wherein a first oil port (A), a second oil port (B), a third oil port (C), and a fourth oil port (D) are provided on the hydraulic motor (1);
wherein the positive control loop (2) comprises a first working oil port (E) and a second working oil port (F), which respectively suctions oil through a positive control loop inlet port (E') and returns the oil through a positive control loop outlet port (F'); the first working oil port (E) of the positive control loop (2) connects with the first oil port (A) of the hydraulic motor (1), the second working oil port (F) of the positive control loop (2) connects with the second oil port (B) of the hydraulic motor (1), the positive control loop inlet port (E') connects with an outlet port of the hydraulic pump (4), and the positive control loop outlet port (F') connects with the oil tank (T) or an inlet port of the hydraulic pump (4); wherein the positive control loop (2) is an open loop with a separate meter-in and separate meter-out control system, or a closed loop controlled by the hydraulic pump (4);

wherein the negative control loop (3) comprises a third working oil port (G) and a fourth working oil port (H), which respectively suctions the oil through the negative control loop inlet port (G') and returns the oil through the negative control loop outlet port (H'); the third working oil port (G) of the negative control loop (3) connects with the third oil port (C) of the hydraulic motor (1), the fourth working oil port (H) of the negative control loop (3) connects with the fourth oil port (D) of the hydraulic motor (1), the negative control loop inlet port (G') connects with the accumulator (5), and the negative control loop outlet port (H') connects with the oil tank (T) or the accumulator (5); wherein the negative control loop (3) is an open loop with a separate meter-in and separate meter-out control system, or an open loop controlled by a proportional direction valve;

wherein the positive control loop (2) and the negative control loop (3) work independently and can be used interchangeably; when system needs higher driving force, the positive control loop (2) and the negative control loop (3) drive the hydraulic motor (1) together; when the system needs lower driving force, one of the positive control loop (2) or the negative control loop (3) individually drives the hydraulic motor (1), while the other one stops working; when the hydraulic motor (1) is in decelerating-braking or is dragged to move by load, the positive control loop (2) stops working, and the negative control loop (3) stores braking kinetic energy and potential energy of the load into the accumulator (5) for energy recovery.

2. The double-loop control system with the single hydraulic motor, as recited in claim 1, wherein the hydraulic motor (1) is an axial piston hydraulic motor or a blade hydraulic motor; the hydraulic pump (4) is a constant hydraulic pump or a two-way displacement-variable pump.

3. The double-loop control system with the single hydraulic motor, as recited in claim 1, wherein when the positive control loop (2) is the open loop with the separate meter-in and separate meter-out control system, the positive control loop (2) comprises a first pressure sensor (27), a second pressure sensor (28), a third pressure sensor (34), a first two-position two-way proportional throttle valve (29), a second two-position two-way proportional throttle valve (30), a third two-position two-way proportional throttle valve (32), a third two-position two-way proportional throttle valve (33), and a first relief valve (31); wherein an inlet port of the first two-position two-way proportional throttle valve (29) connects with the first working oil port (E) of the positive control loop (2), an outlet port of the first two-position two-way proportional throttle valve (29) connects with the positive control loop outlet port (F'); an inlet port of the second two-position two-way proportional throttle valve (30) connects with the second working oil port (F) of the positive control loop (2), an outlet port of the second two-position two-way proportional throttle valve (30) connects with the positive control loop outlet port (F'); an inlet port of the third two-position two-way proportional throttle valve (32) connects with the positive control loop inlet port (E'), an outlet port of the third two-position two-way proportional throttle valve (32) connects with the first working oil port (E) of the positive control loop (2); an inlet port of the fourth two-position two-way proportional throttle valve (33) connects with the positive control loop inlet port (E'), an outlet port of the fourth two-position two-way proportional throttle valve (33) connects with the second working oil port (F) of the positive control loop (2);

wherein when the negative control loop (3) is the open loop controlled by the proportional direction valve, the negative control loop (3) comprises a first check valve (36), a second check valve (37) and an electromagnetic proportional direction valve (35); wherein an electromagnetic proportional direction valve inlet port (P), an electromagnetic proportional direction valve outlet port (O), a first electromagnetic proportional direction valve working oil port (M) and a second electromagnetic proportional direction valve working oil port (N) of the electromagnetic proportional direction valve (35) respectively connect with the negative control loop inlet port (G'), the negative control loop outlet port (H'), the third working oil port (G) of the negative control loop (3), and the fourth working oil port (H) of the negative control loop (3); an outlet port and an inlet port of the first check valve (36) respectively connect with the third working oil port (G) of the negative control loop (3) and the negative control loop outlet port (H'); an outlet port and an inlet port of the second check valve (37) respectively connect with the fourth working oil port (H) of the negative control loop (3) and the negative control loop outlet port (H').

4. The double-loop control system with the single hydraulic motor, as recited in claim 1, wherein when the positive control loop (2) is the closed loop controlled by the hydraulic pump (4), the positive control loop (2) comprises a first relief valve (31), a second relief valve (41), a third relief valve (42), a fourth check valve (36), a second check valve (37), a fifth two-position two-way proportional throttle valve (44), and a slippage pump (43); wherein an inlet port and an outlet port of the first check valve (36) respectively connect with an outlet port of the slippage pump (43) and the first working oil port (E) of the positive control loop (2); an inlet port and an outlet port of the second check valve (37) respectively connect with the outlet port of the slippage pump (43) and the second working oil port (F) of the positive control loop (2); an inlet port and an outlet port of the first relief valve (31) respectively connect with the outlet port of the slippage pump (43) and the oil tank (T); an inlet port and an outlet port of the second relief valve (41) respectively connect with the first working oil port (E) of the positive control loop (2) and the oil tank (T); an inlet port and an outlet port of the third relief valve (42) respectively connect with the second working oil port (F) of the positive control loop (2) and the oil tank (T); two oil ports of the fifth two-position two-way proportional throttle valve (44) respectively connect with the first working oil port (E) and the second working oil port (F);

wherein when the negative control loop (3) is the open loop controlled by the proportional direction valve, the negative control loop (3) comprises an electromagnetic proportional direction valve (35); wherein an electromagnetic proportional direction valve inlet port (P), an electromagnetic proportional direction valve outlet port (O), a first electromagnetic proportional direction valve working oil port (M) and a second electromagnetic proportional direction valve working oil port (N) of the electromagnetic proportional direction valve (35) respectively connect with the negative control loop inlet port (G'), the negative control loop outlet port (H'), the third working oil port (G) of the negative control loop (3), and the fourth working oil port (H) of the negative control loop (3).

5. The double-loop control system with the single hydraulic motor, as recited in claim 1, wherein when the positive control loop (2) is the closed loop controlled by the hydraulic pump (4), the positive control loop (2) comprises a first relief valve (31), a second relief valve (41), a third relief valve (42), a first check valve (36), a second check valve (37), a fifth two-position two-way proportional throttle valve (44), and a slippage pump (43); wherein an inlet port and an outlet port of the first check valve (36) respectively connect with an outlet port of the slippage pump (43) and the first working oil port (E) of the positive control loop (2); an inlet port and an outlet port of the second check valve (37) respectively connect with the outlet port of the slippage pump (43) and the second working oil port (F) of the positive control loop (2); an inlet port and an outlet port of the first relief valve (31) respectively connect with the outlet port of the slippage pump (43) and the oil tank (T); an inlet port and an outlet port of the second relief valve (41) respectively connect with the first working oil port (E) of the positive control loop (2) and the oil tank (T); an inlet port and an outlet port of the third relief valve (42) respectively connect with the second working oil port (F) of the positive control loop (2) and the oil tank (T); two oil ports of the fifth two-position two-way proportional throttle valve (44) respectively connect with the first working oil port (E) and the second working oil port (F);

wherein when the negative control loop (3) is the open loop with the separate meter-in and separate meter-out control system, the negative control loop (3) comprises a first pressure sensor (27), a second pressure sensor (28), a third pressure sensor (34), a first two-position two-way proportional throttle valve (29), a second two-position two-way proportional throttle valve (30), a third two-position two-way proportional throttle valve (32), a fourth two-position two-way proportional throttle valve (33), and a first relief valve (31); wherein an inlet port of the first two-position two-way proportional throttle valve (29) connects with the third working oil port (G) of the negative control loop (3), an outlet port of the first two-position two-way proportional throttle valve (29) connects with the negative control loop outlet port (H'); an inlet port of the second two-position two-way proportional throttle valve (30) connects with the fourth working oil port (H) of the negative control loop (3), an outlet port of the second two-position two-way proportional throttle valve (30) connects with the negative control loop outlet port (H'); an inlet port of the third two-position two-way proportional throttle valve (32) connects with the negative control loop inlet port (G'), an outlet port of the third two-position two-way proportional throttle valve (32) connects with the third working oil port (G) of the negative control loop (3); an inlet port of the fourth two-position two-way proportional throttle valve (33) connects with the negative control loop inlet port (G'), an outlet port of the fourth two-position two-way proportional throttle valve (33) connects with the fourth working oil port (H) of the negative control loop (3).

\* \* \* \* \*